United States Patent
Fage

[11] Patent Number: 5,775,639
[45] Date of Patent: Jul. 7, 1998

[54] THRUST REVERSER WITH PIVOTING DOORS WHICH CAN MOVE IN TRANSLATION

[76] Inventor: Etienne Fage, "Le Moulin" 31, Avenue des Cistes, 83350 Ramatuelle, France

[21] Appl. No.: 544,445

[22] Filed: Nov. 17, 1995

[30] Foreign Application Priority Data

| Dec. 15, 1994 | [FR] | France | 94 15365 |
| Aug. 10, 1995 | [FR] | France | 95 09714 |
| Sep. 4, 1995 | [FR] | France | 95 10330 |

[51] Int. Cl.⁶ ............................................. F02K 1/60
[52] U.S. Cl. .................. 244/110 B; 239/265.29; 239/265.33; 239/265.31; 292/203; 292/146
[58] Field of Search .................. 244/110 B, 129.4, 244/129.5; 60/226.1, 226.2, 229, 230; 239/265.31, 265.37, 265.29, 265.33; 16/85 R; 292/203, 340, 146, 80

[56] References Cited

U.S. PATENT DOCUMENTS

| 1,239,393 | 9/1917 | Hotchkiss | 292/340 |
| 2,211,963 | 8/1940 | Strid | 292/340 |
| 2,590,423 | 3/1952 | Laurih et al. | 292/80 |
| 2,972,860 | 2/1961 | Moy . | |
| 3,164,956 | 1/1965 | Colebrook et al. | 239/265.37 |
| 4,519,561 | 5/1985 | Timms . | |
| 4,743,054 | 5/1988 | Lavalerie . | |
| 4,847,946 | 7/1989 | Nam et al. | 16/53 |
| 5,120,004 | 6/1992 | Matthias | 60/226.2 |
| 5,181,676 | 1/1993 | Lair . | |
| 5,197,694 | 3/1993 | Nash et al. | 244/110 B |
| 5,224,342 | 7/1993 | Lair . | |
| 5,243,817 | 9/1993 | Matthias . | |
| 5,392,991 | 2/1995 | Gatti et al. | 239/265.31 |
| 5,406,814 | 4/1995 | Zeager et al. | 292/340 |

FOREIGN PATENT DOCUMENTS

| 0366829 | 5/1990 | European Pat. Off. . |
| 1388290 | 12/1964 | France . |
| 1134418 | 4/1987 | France . |
| 2614939 | 5/1987 | France . |

*Primary Examiner*—Andres Kashnikow
*Assistant Examiner*—Tien Dinh
*Attorney, Agent, or Firm*—Fisher, Christen & Sabol

[57] ABSTRACT

A thrust reverser with doors (5, 6) for an aircraft jet engine includes a radial stop which includes elements (16, 28) integral with the front end of each door (5, 6) and capable of interacting with mating elements (15, 3) that are integral with the engine. The radial stop is designed to prevent the deployment of the door in an advanced position of its axis of pivoting (P—P) and to allow this deployment in a retreated position of the axis of pivoting (P—P).

29 Claims, 8 Drawing Sheets

THRUST REVERSER WITH PIVOTING DOORS WHICH CAN MOVE IN TRANSLATION

The present invention relates to a thrust reverser for an aircraft jet engine, as well as to an aircraft engine equipped with said thrust reverser.

It is known that thrust reversers for jet engines are used to shorten the stopping distance of an aircraft slowing down, by reversing the direction of the jet of gas delivered by the engine, which reversal produces a reverse braking thrust.

For example, French Patent FR-A-2 348 371 already makes known a thrust reverser for an aircraft jet engine including:

at least one door, the rear end of which is mounted so that it can pivot with respect to said engine, about a fixed axis of pivoting transverse to the longitudinal axis of said engine; and means for making each door pivot about said axis of pivoting, between:

an extreme retracted position, in which said door is folded back with its front end directed toward said engine; and an extreme deployed position, in which said door is arranged at least substantially transversely to said longitudinal axis of the engine, with its front end separated therefrom.

In this type of reverser, locking and safety against untimely deployment of the doors are obtained by a door-locking system (see French Patent FR-A-2 494 775, for example) including:

two moving hooks per door, actuated by jacks and an electro-hydraulic control system;

means for making each door pivot between the normal retracted position and an extreme overretracted position, constituting a prerequisite to the unlocking of the hooks and to the pivoting of the door in the opposite direction toward the extreme deployed position.

When the aircraft is in flight, such a thrust reverser exhibits the drawback of generating additional aerodynamic drag due to the substantial thickness of the tail-end surface of the trailing edge of each door, which leads to an internal thrust loss as well as to an increase in the external drag.

The external drag is moreover also increased owing to the deformations of the doors under the effect of the internal pressure forces which they have to contain and which are balanced only by reactions concentrated at the hooks. What happens is that these deformations mean that the external surfaces of the doors are no longer flush with the surfaces of the adjacent stationary structures.

Moreover, it should be noted that despite the advantages which they offer during the slowing-down phase, thrust reversals are also critical as regards the extra weight to which they give rise.

The present invention aims to alleviate all of the above-mentioned drawbacks, and its first objective is to provide a jet engine equipped with a thrust reverser designed to lead to a reduction, on the one hand, in the thickness of the tail-end surface and, on the other hand, in the external drag resulting from said deformations.

Another objective of the invention is to provide a jet engine equipped with a thrust reverser, in which the additional weight is minimized by comparison with known engines, and whose reliability, particularly in the flight phase, is enhanced.

Another objective is finally to extend to reversers in which the doors do not, in the normal retracted position, withstand significant pressure forces, advantages which are similar as regards safety against accidental deployment to those from which reversers with pressurized doors and controlled overretraction may benefit (see for example FR-A-2 494 775).

To this end, according to the invention, the reverser of the type recalled hereinabove, additionally including means for displacing said axis of pivoting along said longitudinal axis of the engine, between an advance position and a retreated position and vice versa, is noteworthy:

in that it includes radial stop means including elements integral with the front end of each door and capable of interacting with mating elements integral with said engine; and in that said radial stop means are designed to prevent the deployment of said door in the advanced position of said axis of pivoting and to allow this deployment in the retreated position of said axis of pivoting.

For preference, the distance separating said advanced and retreated positions along the longitudinal axis of the engine is of the order of 1% to 2% of the diameter of the outlet orifice of the engine.

Thus, according to the invention, said radial stop means constitute means for locking the door which are much less cumbersome than the system with hooks because they introduce reactions which are distributed along the front end of the door and have no moving parts or associated electro-hydraulic systems. Furthermore, they guarantee that the stationary and moving surfaces lie perfectly flush with one another, thereby eliminating a source of increased external drag attributable to the reverser. Furthermore, the retreat of the door prior to its deployment makes it possible to extend the length of the outer cowls and of the flanges so as to reduce the "fish-mouth" cutout formed between the reverser doors, as well as the residual thickness of the tail-end surface. Finally, this retreat also leads to a reduction in the back pressure created by the deployment of the door, thus facilitating the integration of the thrust reverser into the engine.

For preference, said means for displacing said axis of pivoting are formed by the means for pivoting said door.

In a preferred embodiment, said means for displacing said axis of pivoting along said longitudinal axis of the engine include guide means having slideways and sliders.

In this case, associated with each door are two sliders and two slideways, said sliders defining said axis of pivoting and the position of said axis of pivoting along said longitudinal axis of the engine being defined by the relative position of each slider in each slideway.

Said sliders could be borne by the engine, while said slideways would be integral with said door. However, advantageously, said sliders are integral with said door, while said slideways are provided on said engine.

The displacement of the axis of pivoting between its advanced position and its retreated position may take place parallel with the axis of said engine, said slideways then being straight and parallel to the latter axis. However, in order further to reduce the "fish-mouth" cutout and the thickness of the tail end, it may be advantageous that, in the retreated position, said axis of pivoting is further from said longitudinal axis of the engine than in the advanced position and that said means for displacing said axis of pivoting along said longitudinal axis of the engine are designed to separate said axis of pivoting from said longitudinal axis of the engine when said axis of pivoting passes from its advanced position to its retreated position and, conversely, to bring said axis of pivoting closer to said longitudinal axis of the engine when said axis of pivoting passes from its retreated position to its advanced position.

In this case, said slideways may exhibit an arched or elbowed shape, the front portion (on the same side as the advanced position of said axis of pivoting) of said slideways being the portion closest to said longitudinal axis of the engine.

As an alternative, in the case where said door is subjected, on the part of said engine, to pressure forces acting in the direction of deployment, said slideways may exhibit a shape such that in the extreme retracted position of said door and in the advanced position of said axis of pivoting, the interaction of said sliders with said slideways, combined with the action of said pressure forces on said door, locks said axis of pivoting in its advanced position and thus prevents deployment of the door.

In order to obtain this self-locking effect, said slideways may have the shape of an arc, the front portion of which is further from said longitudinal axis of the engine than the central portion of said arc.

The force therefore opposing the retreat of the doors increases with the internal pressure acting on them. Said force therefore increases with the engine speed and speed of the aircraft and the force of the means bringing about retreat of the doors can be adjusted so that this retreat is impossible above an engine speed close to low idle and above an aircraft speed which is little above the approach speed. Thus, even in the event of untimely operation of said means bringing about retreat of the doors, complete protection is afforded against the risks of deployment in flight during the phases of takeoff, climb, cruising flight, descent, and overshoot in the event of a balked landing. This protection is particularly noteworthy in terms of reliability and saving in mass, because it is obtained without requiring the addition of any additional device whatsoever.

Furthermore, to ensure stability of said axis of pivoting in its advanced position and its retreated position, when the internal pressure forces are low or nonexistent, said means of displacement are advantageously associated with a bracing system urged by elastic stop means designed, on the one hand, to confer upon said axis of pivoting two stable positions corresponding respectively to said advanced and said retreated positions and, on the other hand, to allow said axis of pivoting to change position under the effect of a force greater than a threshold determined by said elastic stop means.

In the case where said axis of pivoting is defined by two aligned pivots respectively arranged on either side of said door, said bracing system then includes, for each pivot, a link rod connected to said pivot at one of its ends and articulated at its other end to a rod capable of being displaced axially along an axis parallel to the longitudinal axis of the engine, said rod being urged by a spring-loaded stop capable of opposing its axial displacement.

In the usual case in which said thrust reverser includes two doors which are opposed and symmetric with respect to said longitudinal axis of the engine, it is advantageous that, for each pair of pivots arranged one facing the other and associated respectively with each of the two opposed doors, said bracing system comprises a rod extending substantially in the plane of symmetry of the engine, and two symmetric link rods each articulated to said rod and connected respectively to one of said pivots.

Said radial stop means may be formed on the one hand by the front edge of said door and, on the other hand, by the rear edge of the upstream part of said engine, said front edge of the door being designed to engage at least locally under said rear edge of said upstream part of the engine.

As an alternative, said radial stop means may be formed on the one hand by pegs projecting longitudinally with respect to the front edge of said door and, on the other hand, by housings formed axially relative to the rear edge of the upstream part of said engine and each capable of housing a peg.

According to another alternative embodiment, said means for displacing the pivots may include, for each door, two rotary pivot holders each one borne by a spindle for rotation integral with the engine and each bearing an eccentric pivot, the two pivots being aligned in order to define said axis of pivoting. Thus, said aligned pivots may simultaneously adopt either an advanced position or a retreated position, said positions of said pivots of course defining an advanced position and a retreated position for said axis of pivoting. In this alternative, the displacement of the pivots is therefore identical to the displacement obtained in the alternative having slideways and sliders when the slideways have the shape of an arc of a circle.

According to yet another alternative, said radial stop means are formed on the one hand of at least one stop element integral with the front end of said door and, on the other hand, by as many receptacles integral with the stationary upstream part and with each of which a stop element may interact, said stop elements and receptacles having a cam profile designed to generate a reaction including a longitudinal component capable of opposing the retreat of the door. This alternative makes it possible to prevent the retreat and deployment outside of voluntarily restricted flight conditions (engine speed close to low idle and aircraft speed close to the approach speed) in the case where displacement of the pivots cannot take place along an arc guaranteeing the self-locking effect.

In the case where cooperation between said stop element and said receptacle would run the risk of leading to seizures, during unlocking by overretracting the doors and retreating the pivots, the uncontrollable variation in the frictional forces leading to a certain degree of imprecision on the actual unlocking conditions, it is advantageous to provide, as an alternative, an automatic overretraction system such that:

in the retracted position, each door is subjected to the action of elastic means in the direction of over-retracting said door; and said reverser includes anti-retreat means which prevent the passage of said axis of pivoting from its advanced position to its retreated position as long the pressure forces exerted by said engine on said door in the direction of deployment are above the opposing force exerted on said door by said elastic means.

Thus, any parasitic friction in unlocking and retreat is eliminated and the unlocking movement (over-retraction) is made independent of the retreat movement of the pivots. The means of displacement therefore provide for the retreat and unlocking in incredibly reliable and reproducible conditions.

Said elastic means and/or said anti-retreat means may be independent of said radial stop means or alternatively be integrated therein.

In the case where said elastic means are independent of said radial stop means, they are borne either by the front end of each door or by the engine. They interact with supports which are then respectively borne either by the engine or by the front end of each door. These elastic means may have any appropriate shape. For example, they are made in the form of coil springs, leaf springs, or spring-loaded pistons.

For preference, said radial stop means include, for each door, at least one stop element integral with the front end of said door and at least one receptacle integral with said engine, said receptacle being open facing the axis of said engine and the interaction of said stop element and said receptacle opposing the retreat of the axis of pivoting from its advanced position to its retreated position, when the corresponding door is in the retracted position.

In order to ensure stability of said axis of pivoting in its retreated position, when the deployed doors are retracted, there are additionally provided means for hardening said elastic stop means when said door is retracted from its deployed position to its retracted position, said axis of pivoting then being in the retreated position. For preference, these hardening means are hydraulic. For example they may comprise a piston loaded by the fluid from the hydraulic line of the door retraction jack and pressing said elastic stop means.

In order to allow the present invention to be implemented in structures in which each door is not spontaneously (naturally) subjected to significant pressure forces by the engine, it is advantageous to provide at least one chamber which is pressurized by the exhaust gases from the jet pipe and provided with a flexible seal which, when the door is retracted, presses in a sealed manner against the internal face of said door, therein delimiting a pressurized zone of precise surface area. It will be noted that these exhaust gases are at low pressure, that is to say at a pressure which is markedly less than that of the gases leaving the compressor of the engine.

Of course the present invention also relates to a jet engine for an aircraft, including a thrust reverser as specified hereinabove.

The figures of the appended drawing will make it clear how the invention may be achieved. In these figures, identical references denote similar elements. Furthermore, these figures are diagrammatic and are not necessarily to scale.

FIG. 10a is a diagrammatic external view of the reverser in accordance with the present invention, in the retracted position of the doors, with the axes of pivoting thereof in the advanced position, illustrating yet another alternative of the radial stop means of said reverser.

FIG. 10b is a part longitudinal section on Xb—Xb of FIG. 10a.

FIGS. 11a and 11b correspond respectively to FIGS. 10a and 10b, the doors still being in the retracted position, but their axes of pivoting in the retreated position, and FIG. 11b corresponding to the sectioning line XIb—XIb of FIG. 11a.

FIG. 12a illustrates, in perspective, another embodiment of said radial stop means, close to those represented in FIG. 7a.

Figure 1:
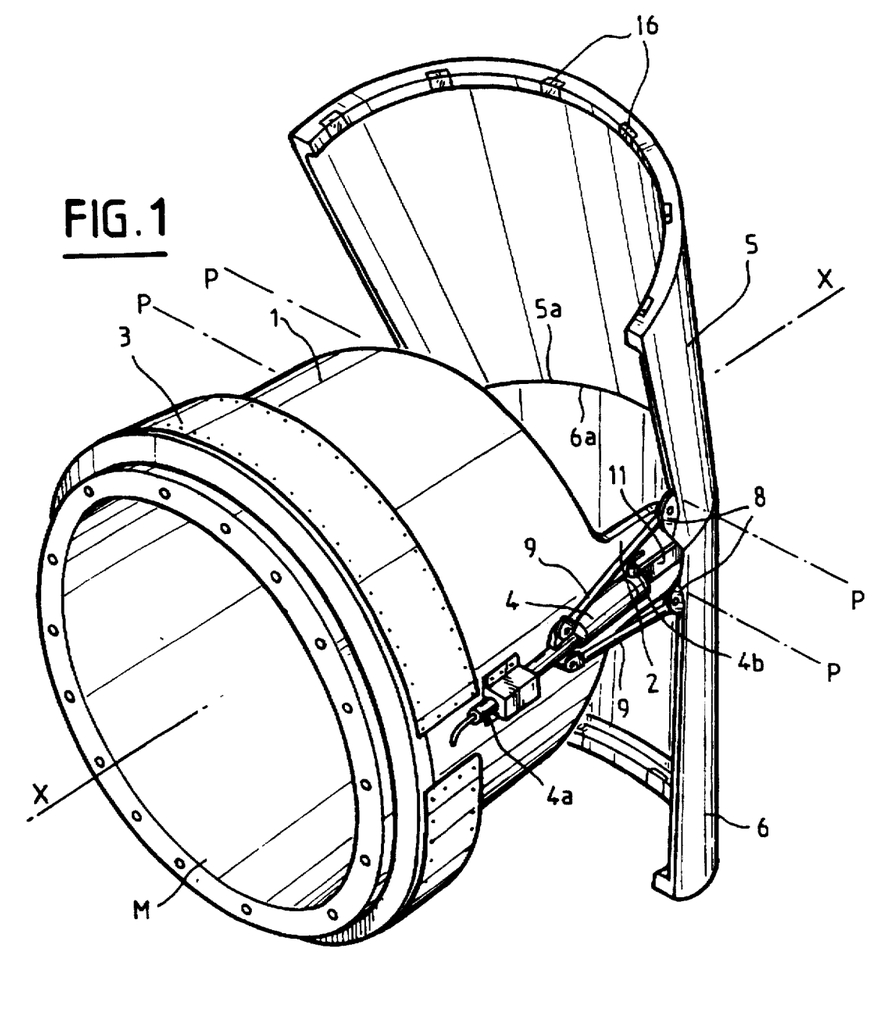
FIG. 1 shows, in partial diagrammatic perspective, a jet engine provided with a thrust reverser with doors in accordance with the present invention.

The jet engine M with thrust reverser represented diagrammatically and partially in FIG. 1 has a longitudinal axis X—X and, in known fashion, includes a jet pipe 1 extended by two diametrically opposed flanges 2, just one of which is visible in FIG. 1.

Figure 2:
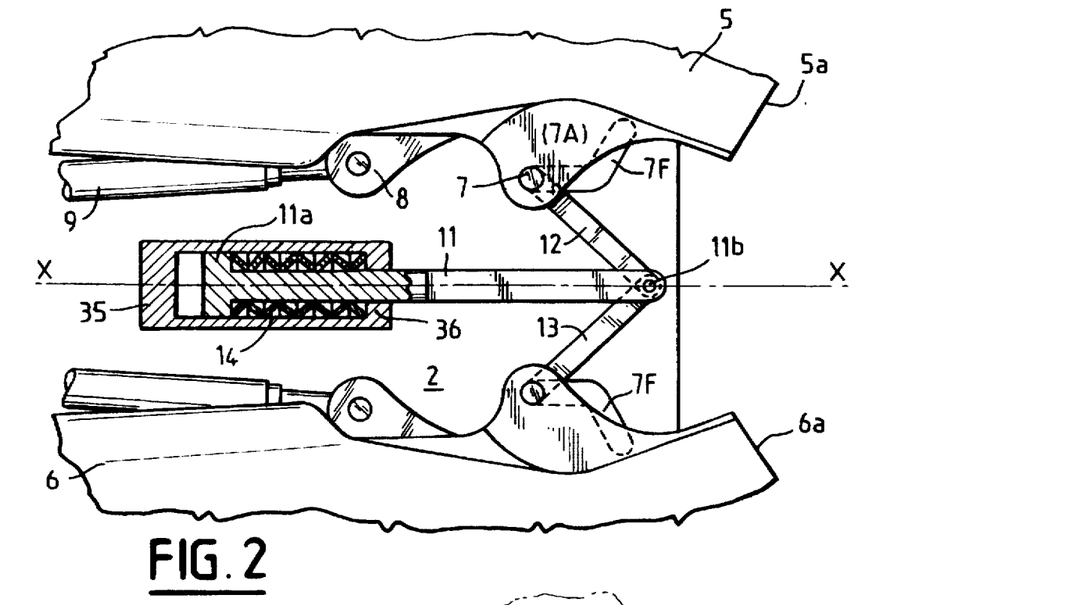
FIG. 2 is an enlarged partial schematic longitudinal view, partly in section, of the rear part of the doors of an advantageous embodiment of the thrust reverser of FIG. 1 in the advanced position of the pivots which define the axis of pivoting of said doors.
Figure 3:
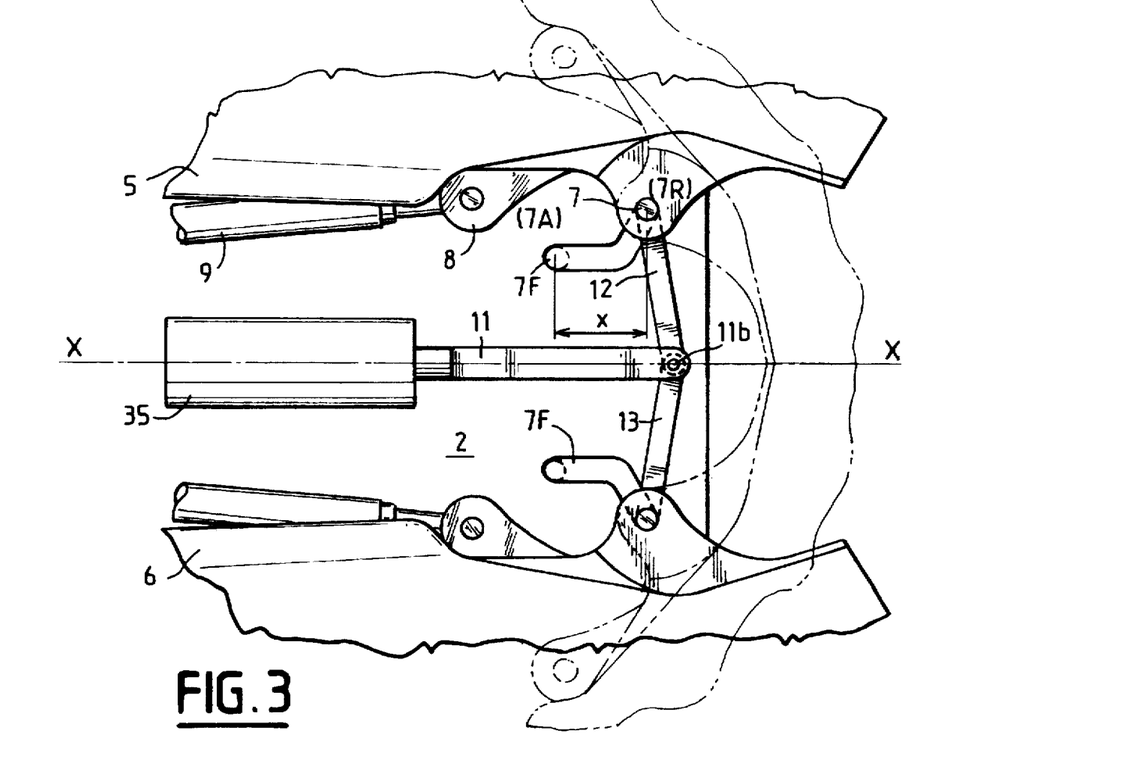
FIG. 3 is a longitudinal view similar to that of FIG. 2, in the retreated position of said pivots.

The thrust reverser of the jet engine includes two identical reverser doors 5, 6 which are symmetric with respect to said longitudinal axis X—X and each mounted so that it can pivot about an axis of pivoting P—P defined by two transverse pivots 7 (see FIGS. 2 and 3).

Each of the doors 5, 6 is borne by two attachment fittings 8, arranged in line with the rear corners of said doors, and articulated about the transverse pivots 7.

The doors 5, 6 furthermore have a rear face 5a, 6a respectively (see FIGS. 2 and 3), extending in a plane which is oblique with respect to the longitudinal axis X—X of the engine and are associated with means of pivoting capable of making them pivot between two extreme positions:

a folded or retracted position (shown by FIGS. 2 and 3), in which the doors 5, 6 extend in the extension of the cowl 3 of the engine M, so as to mold themselves to it externally, and internally, together with the flanges 2, form continuity of the jet pipe 1. In addition, in this retracted position, the rear faces 5a, 6a of the doors 5, 6 delimit an oblique cutout, in the shape of a "fish mouth"; and a deployed position (represented in FIG. 1 and in dot and dash line in FIG. 3) in which the doors 5, 6 are butting against each other by their rear faces 5a and 6a, and are arranged so as to intercept and reverse the jet of gas leaving the jet pipe 1.

The means for pivoting the doors 5, 6 include, in the region of each flange 2, at least one double-acting jack 4 arranged longitudinally and connecting rods 9, articulated to the jack 4 and each articulated to one attachment fixture 8. The jack 4 is supplied with hydraulic fluid via a supply 4a for the deployment of said doors and via a supply 4b for retracting them.

As the elements described herein-above are well known, they will not be described in further detail in the present description.

In accordance with the present invention, each transverse pivot 7 borne by a reverser door 5 or 6 is housed in a slot 7F provided in a flange 2 facing and extending along said longitudinal axis X-X, each pivot 7 being able to slide in the associated slot 7F in the manner of a slider in a slideway.

Furthermore, each pivot 7/slot 7F pairing is associated with a bracing system 11-14, 35 with spring-loaded stop designed to confer two stable positions 7A (advanced position) and 7R (retreated position) upon the transverse pivots 7.

In their advanced stable position 7A, the two pivots 7 of a door 5, 6 bear against the front end of the two associated slots 7F (see FIG. 2) and they define the stable advanced position of the corresponding axis of pivoting P—P.

Likewise, in their retreated stable position 7R, the two pivots 7 of a door 5, 6 bear against the rear end of the two associated slots 7F (see FIG. 3) and they define the rear stable position of the corresponding axis of pivoting P—P (as represented in FIG. 1).

The bracing system 11-14, 35 includes a rod 11 which extends coaxially with the longitudinal axis X—X and to the rear end of which are articulated (at 11b) two link rods 12, 13 each bearing a pivot 7 at their opposite end from the rod 11, one of said pivots 7 (the one borne by the link rod 12) corresponding to the door 5 and the other (the one borne by the link rod 13) to the door 6.

At its front end, the rod 11 includes a head 11a housed in a cylindrical body 35 provided with a rear wall 36 which is pierced with an orifice through which said rod passes. The cylindrical body 36 furthermore contains a spring-loaded stop 14 consisting, for example, of a stack of Belleville washers through which said rod 11 passes and designed so that the head 11a of the rod 11 is elastically spaced away from the rear wall 36.

As FIGS. 2 and 3 show, the link rods 12, 13 and the layout of the spring-loaded stop 14 are designed so that said link rods can adopt two distinct bracing positions between which the pivots 7 undergo a displacement in the slots 7F from one end thereof to the other, giving rise to a longitudinal displacement of the doors 5, 6 as may be seen by comparing FIGS. 2 and 3.

Figures 10A, 10B:
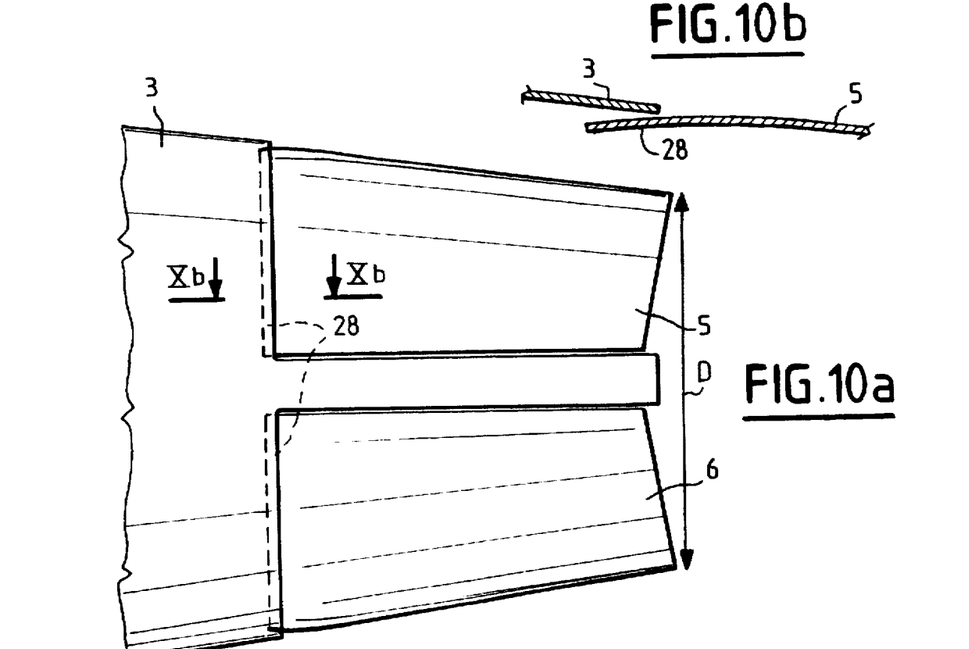
Figures 11A, 11B:
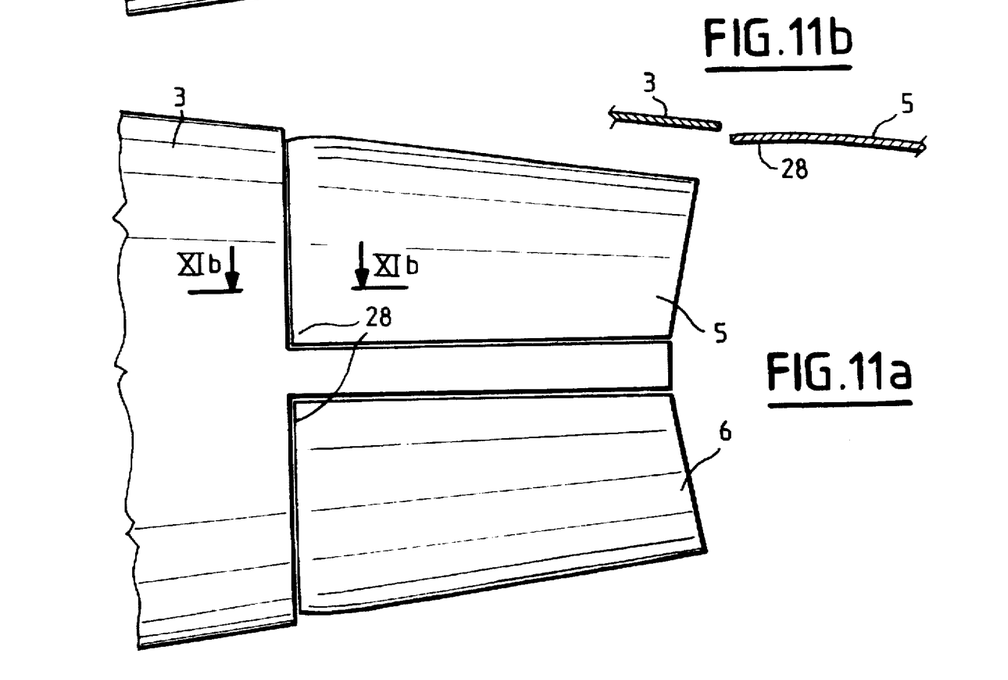

In these figures, it may be seen that each pivot 7, being guided by the associated slot 7F is displaced along the axis X—X by a distance x between its advanced position 7A and its retreated position 7R and vice versa. This distance x is of the order of 1% to 2% of the diameter D of the outlet orifice of the engine (see FIG. 10a).

Moreover, the thrust reverser includes radial stop means capable of preventing the deployment of the doors 5, 6 in the advanced position 7A of the pivots (FIG. 2), and of allowing this deployment in the retreated position 7R of said pivots (FIG. 3). Of these radial stop means, only stop elements 16 borne by the front edges of the doors 5, 6 and designed to interact with complementary elements (not represented) borne by the engine M are represented diagrammatically in FIG. 1.

When said doors 5, 6 have to be deployed and such deployment is authorized by the flight conditions of the aircraft, the jacks 4 break the rear bracing of the link rods 12, 13 by compressing the spring-loaded stop 14, which leads to a retreat of the doors 5, 6.

The front bracing of the link rods 12, 13, obtained automatically when the pivots 7 pass from their advanced position 7A to their retreated position 7R then holds the doors 5, 6 in this retreated position allowing deployment of the doors 5, 6 (see FIG. 3).

After the doors 5, 6 have been deployed, retraction of the jacks 4 allows them to be folded back.

At the end of folding, under the effect of the pulling of the jacks 4, the link rods 12, 13 return to the rear bracing position allowing the doors 5, 6 to be returned to their stable advanced position, while the pivots 7 pass from the retreated position 7R to the advanced position 7A.

It may thus be seen that by virtue of the present invention, the doors are held in their advanced (safety) position by the elastic bracing system 11-14, 35. They may be deployed only when the jacks receive the order to push, and said jacks are dimensioned to be able to overcome this bracing with a reasonable margin.

In the embodiment of the invention illustrated by FIGS. 2 and 3, each slot 7F forming a slideway has an elbowed shape, the front portion of a slot 7F, which corresponds to the advanced position 7A of the pivots 7, being the portion of this slot closest to the longitudinal axis X—X of the engine.

Thus, in the retreated position 7R of the pivots 7, the axis of pivoting P—P is further from said longitudinal axis X—X of the engine than in the advanced position 7A, which favors the layout of the flanges 2 and of the elements which they bear to contrive for the best kinematics of the doors 5 and 6.

Figure 4:
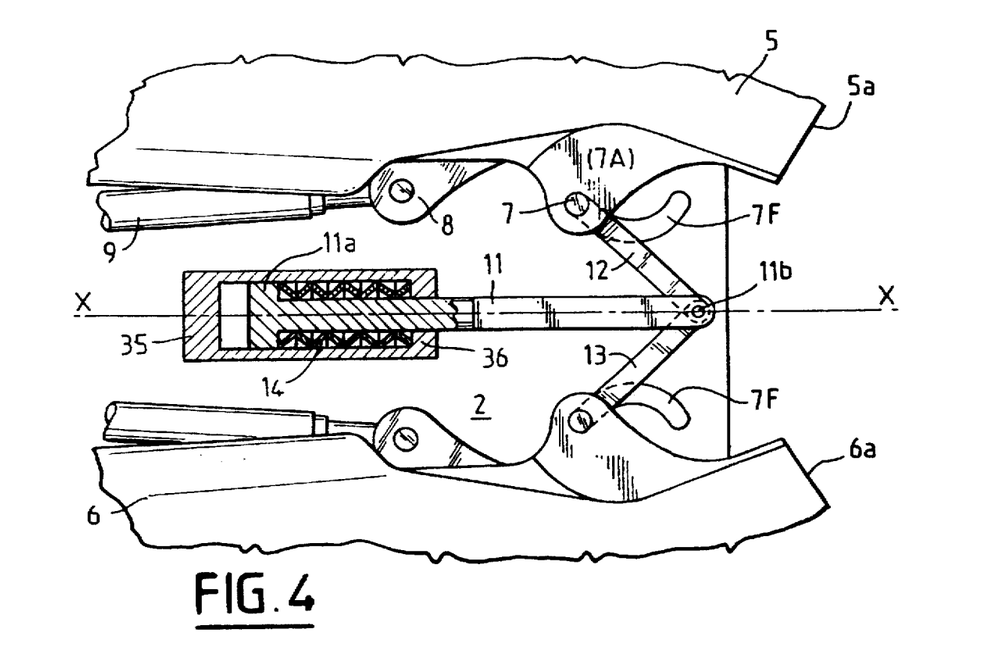
FIG. 4 illustrates partially and diagrammatically, in a view comparable with FIG. 2, another advantageous alternative embodiment of the reverser in accordance with the present invention.

In the alternative embodiment of FIG. 4, each slot 7F forming a slideway has at least the approximate shape of an arc of a circle, in which the end positions, and especially the front portion (corresponding to the front position 7A of the pivots 7) are further from said longitudinal axis X—X of the engine than the central portion of said arc of a circle.

Thus, in the advanced retracted position of a door, interaction of said pivots 7 with the front portions of the slots 7F, combined with the centrifugal action of the pressure forces on said door, locks the corresponding axis of pivoting P—P in its advanced position. It will be noted that the greater the pressure forces, that is to say the higher the engine speed, the greater will be the locking so that it is not necessary to provide means for protecting against retreat of said door.

Figure 5:
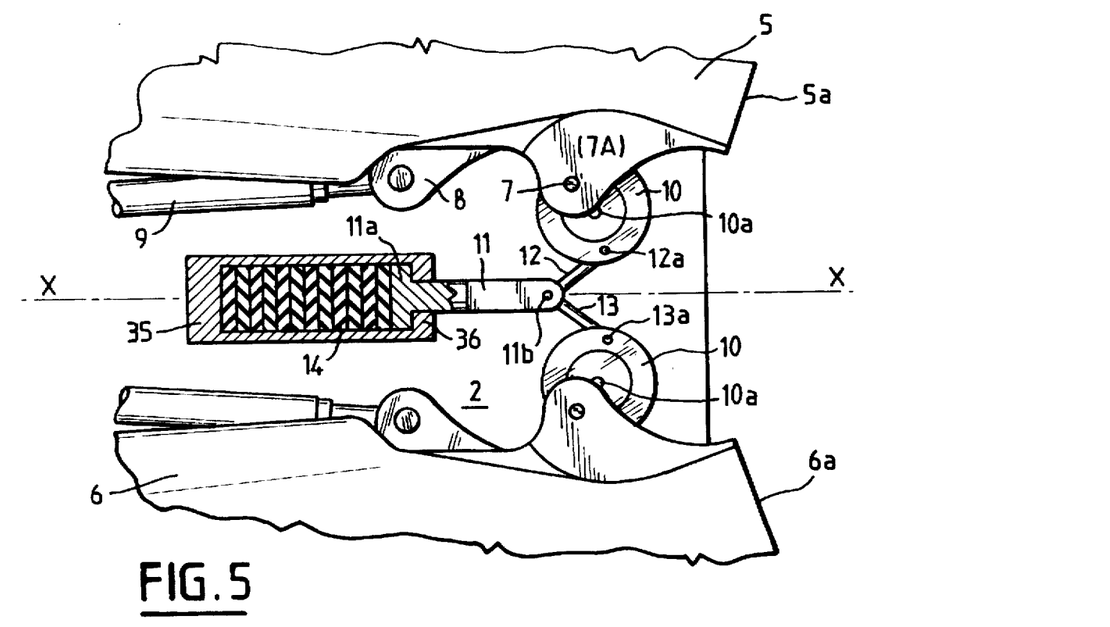
FIG. 5 is a partially sectioned diagrammatic longitudinal view comparable with FIG. 2, of the rear part of the doors of an alternative embodiment of the thrust reverser in accordance with the present invention, in the advanced position of the pivots.
Figure 6:
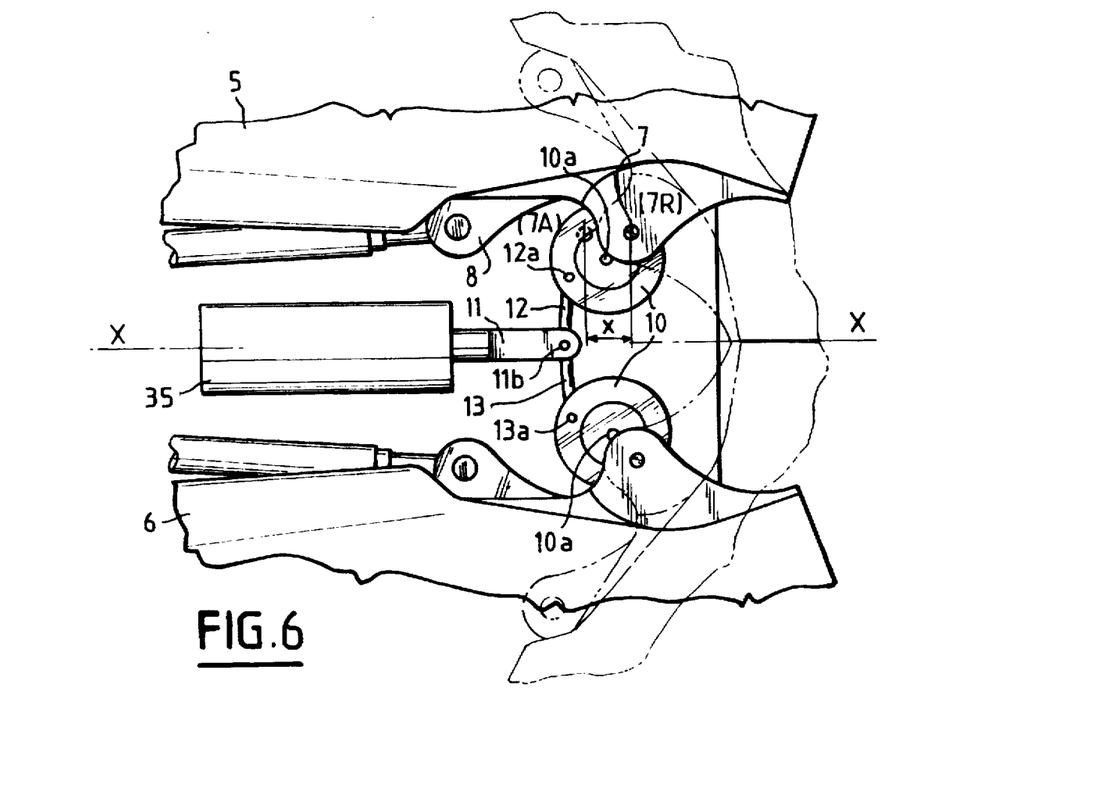
FIG. 6 is a longitudinal view of the reverser of FIG. 5, in the retreated position of the pivots.

In the alternative embodiment of the present invention which is illustrated diagrammatically by FIGS. 5 and 6, each transverse pivot 7 is mounted in an eccentric fashion on a rotary pivot holder 10, for example in the form of a disk, borne by a spindle of rotation 10a integral with a flange 2, so that it can be displaced longitudinally along a circular sector, upon deployment or retraction of the jack 4.

In addition, each disk 10 is associated with a bracing system 11-14, 35 with a spring-loaded stop, this system being designed to confer two stable positions upon the disks 10, and consequently two stable positions 7A (advanced position) and 7R (retreated position) on the transverse pivots 7 and therefore on the axes of pivoting P—P.

This bracing system includes a rod 11 which extends coaxially to the longitudinal axis X—X and to the rear end of which are articulated (at 11b) two link rods 12, 13 themselves articulated respectively to the disks 10 associated respectively with the doors 5 and 6, so as to allow said doors to be displaced simultaneously.

At is front end, the rod 11 includes a head 11a housed in a cylindrical body 35 provided with a rear front wall 36 pierced with an orifice through which said rod passes. The cylindrical body 35 additionally contains a spring-loaded stop 14 consisting for example of a stack of Belleville washers designed so that the head 11a of the rod 11 is positioned between an elastic front stop consisting of this spring-loaded stop 14 and a stationary rear stop consisting of the rear front wall 36 of the cylindrical body 35.

As FIGS. 5 and 6 show, the points 12a, 13a at which the link rods 12, 13 are articulated to the disks 10 and the arrangement of the spring-loaded stop 14 are designed so that said link rods adopt two distinct bracing positions between which the disks 10 undergo a rotation of the order of a quarter to a third of a circle, giving rise to a longitudinal displacement of the doors 5, 6 as may be seen by comparing FIGS. 5 and 6.

In these figures, it may be seen that each pivot 7 is displaced along the axis X—X by a distance x between its advanced position 7A and its retreated position 7R and vice versa.

The thrust reverser furthermore includes radial stop means capable of preventing the deployment of the doors 5, 6 in the advanced position 7A of the pivots (FIGS. 2, 4 and 5) and of authorizing this deployment in the retreated position 7R of said pivots (FIG. 6).

Figure 7A:
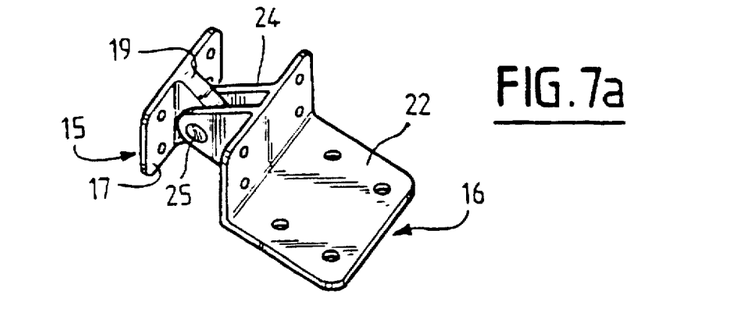
FIG. 7a is a perspective view of one embodiment of the radial stop means equipping the thrust reverser in accordance with the present invention.
Figure 7B:
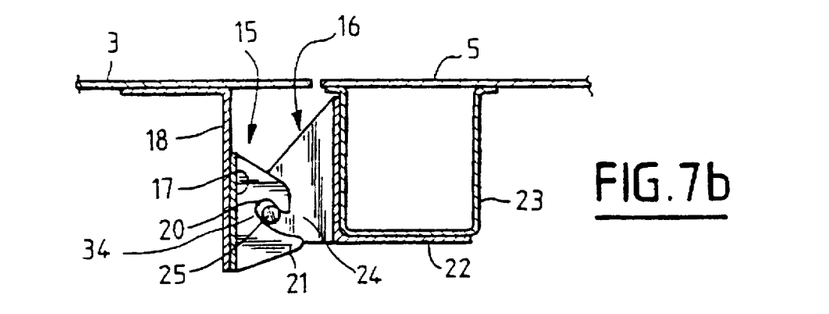
FIG. 7b is a longitudinal section of the radial stop means of FIG. 7a, mounted on an engine in accordance with the present invention.

As FIGS. 7a and 7b show, these stop means may comprise elements 15 forming a receptacle, which are intended to be secured to the stationary upstream part 3 of the jet pipe 1, and stop elements 16, designed to be engaged in the receptacles 15 and intended to be secured to the front end of the doors 5 or 6.

The elements 15 forming a receptacle comprise a mounting plate 17 designed to be secured to a bracket-shaped frame 18 for reinforcing the upstream part of the jet pipe 1. This mounting plate 17 furthermore bears a receptacle wall 19 orthogonal to said mounting plate, provided with a notch 20 which is inclined upward and delimited at the front by an inclined upper internal face. This front portion 34 for guiding the corresponding stop element 25 during displacements of the axis of pivoting (P—P) between its advanced position and retreated position is designed to lead to a displacement of the stop element 25 in a path substantially inclined with respect to the longitudinal axis (X—X) so as to give rise to overretraction of the door (5, 6) during a displacement toward the rear of said stop element.

Furthermore, this receptacle wall 19 forms, in the lower continuity of the notch 20, an appendage 21 extending in the rear extension of said wall and including an upper face designed to act as a bottom stop for a radial stop element 16 integral with a door 5, 6 at the end of folding of said door, so as to allow the rear bracing of the link rods 12, 13 to be broken.

The stop elements 16 comprise a support plate 22 in the form of an angle bracket designed to be secured to a U-shaped frame 23 for reinforcing the front end of the doors 5 or 6. This support plate 23 bears a clevis block 24 extending orthogonally with respect to one of its flanges, housing a transverse peg 25 designed to penetrate, with clearance, the notch 20 of a receptacle element 15.

As illustrated diagrammatically in FIG. 1, a plurality of such means 15, 16 may be distributed around the circumference of the upstream end 3 of the jet pipe 1 and of the front end of the doors 5, 6 so as to obtain correct distribution of loading.

Owing to the shape of the notch 20, such stop means are designed to generate, when the pegs 25 are housed in the notches 20, a reaction which has a longitudinal component tending to oppose any retreat of the doors 5, 6, even in the event of an attempt to deploy the central jack, and to do so as long as the aerodynamic forces acting on these doors are above a given threshold representing a landing phase of the aircraft.

Once the aerodynamic forces drop below this threshold, deployment of the central jack makes it possible to break the rear bracing of the link rods 12, 13 by action on the spring-loaded stop 14, leading to a retreat of the doors 5, 6.

The front bracing of the link rods 12, 13 obtained automatically upon rotation of the disks 10 keeps the doors 5, 6 in this retreated position allowing subsequent folding of the doors 5, 6.

At the end of folding, furthermore, and indicated hereinabove, the link rods 12, 13 return to the rear bracing position allowing the doors 5, 6 to be returned to their advanced position, by virtue of the appendage 21 of the radial stop element.

Figure 8:
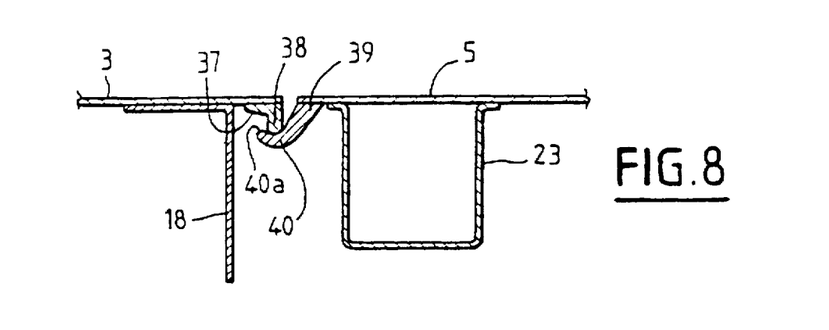
FIGS. 8 and 9 show, in longitudinal section, alternative embodiments of said radial stop means.

FIG. 8 represents another embodiment aimed at an alternative radial stop means, whose objective is the same as that of the radial stop means described hereinabove, namely to prevent retreat of the doors 5, 6 outside specific conditions corresponding to the landing phase.

These radial stop means are, in this case, not borne by fixtures such as fixtures 17, 22 described hereinabove, but by reinforcing strips 37, 39 integral respectively with the rear end of the stationary upstream part and with the front end of the doors 5, 6.

It will be noted that it is not necessary for these reinforcing strips 37, 39 to extend over the entire periphery of the doors 5, 6 and that in general, it is enough to arrange then over a sector of twenty to thirty degrees on either side of the plane of symmetry of said doors.

The radial stop means borne by these reinforcing strips 37, 39 have the overall shape of hooks 39, 40 provided with interaction surfaces which are inclined with respect to the horizontal and designed to create a reaction including a longitudinal component tending to oppose any retreat of the doors 5, 6.

Furthermore, the hook 40 integral with the doors 5, 6 has a chamfered front face 40a allowing this hook to be engaged with the hook 39 opposite as the doors 5, 6 advance.

With such radial stop means, breakage of the rear bracing of the link rods 12, 13 is obtained by any stop means known per se used to limit the rotation of the doors 5, 6 as they are folded back.

Figure 9:
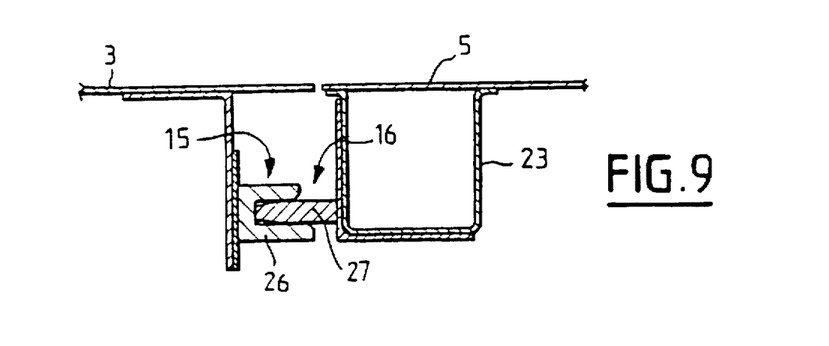

FIG. 9 shows an alternative according to which the radial stop means generate a simple reaction orthogonal to the longitudinal axis X—X, according to which either the force to be exerted by the braces has to be sufficient to guarantee a stable position of the doors 5, 6 in the advanced position, or auxiliary locking means have to be provided.

According to this alternative, the elements forming a receptacle 15 include, in place of the receptacle wall 19, a longitudinal sleeve tube 26 and the stop elements 16 include a longitudinal finger 27 capable of engaging axially in the sleeve tube 26.

FIGS. 10a, 10b, 11a and 11b illustrate another alternative according to which the reaction generated by the stop means is also strictly orthogonal to the longitudinal axis X—X.

As represented in these figures, the doors 5, 6 have a front edge 28 inflected towards the axis of the engine, so that it engages, at least in part, under the upstream edge 3 of the jet pipe 1, in the advanced position of said doors 5, 6.

Figure 12A:
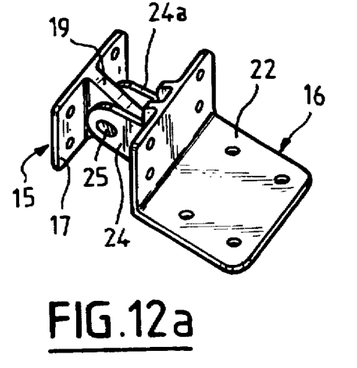
Figure 12B:
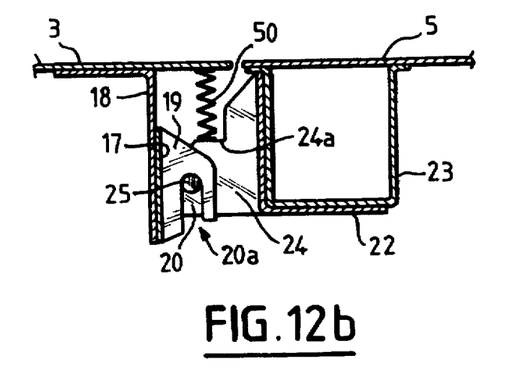
FIG. 12b is a longitudinal section of the radial stop means of FIG. 12a, mounted on an engine in accordance with the invention.

In FIGS. 12a and 12b, there is represented yet another alternative embodiment of said radial stop means 15, 16 similar to the embodiment described with regard to FIGS. 7a and 7b. However, in this case, the clevis block 24 is shaped to include a seat 24a for a spring 50 (a leaf spring, coil spring or some other spring), bearing against the jet pipe 1 in order to press said door 5 or 6 in the direction of the axis X—X, that is to say to tend to overretract said door.

Owing to the shape of the notches 20, the stop means 16 oppose any retreat of the doors 5 and 6 when the pegs 25 are housed in said notches 20, even in the event of an attempt to deploy the jacks, and do so for as long as the aerodynamic forces acting on these doors are greater than the forces exerted by the springs 50.

When these aerodynamic forces drop below the forces exerted by the springs 50, the latter over retract the doors 5, 6 so that the pegs 25 come out of the notches 20. The doors then remain in their stable over retracted position until the jacks 4 receive the order for deployment. The pushing of the jacks 4 then allows the rear bracing of the link rods 12, 13 to be broken against the action of the spring-loaded stop 14, which allows retreat of the doors 5, 6.

The front bracing of the link rods 12, 13 obtained automatically by the displacement of the pivots 7 then keeps the doors 5, 6 in this retreated position allowing deployment of the doors 5, 6 (see FIG. 3).

After the doors 5, 6 have been deployed, retraction of the jacks 4 allows them to be folded as far as overretracted.

At the end of folding, under the effect of the continuous pull from the jacks 4, the link rods 12, 13 return to the rear bracing position allowing the over retracted doors 5, 6 to be returned to their stable advanced position while the pivots 7 pass from the retreated position 7R to the advanced position 7A.

The pegs 25 of the overretracted doors 5, 6 are then positioned on the entry 20a to the notches 20. When the hydraulic pressure is cut off, the doors 5, 6 remain in this stable advanced position and will return from overretracted to retracted, the pegs 25 engaging in the notches 20 as soon as the aerodynamic forces acting on said doors 5, 6 become greater than the forces exerted by the springs 50. We are now back in the position illustrated in FIG. 2.

It may thus be seen that by virtue of the present invention, the doors 5, 6 remain mechanically locked for all the flight conditions leading to a pressure difference acting on the doors which is greater than a threshold determined by the springs 50 and chosen to correspond to an engine speed close to low idle and to an aircraft speed little above the approach speed. This mechanical locking prevents any displacement of the reverser, even in the event of an accidental or deliberate deployment order.

It will additionally be noted that overretraction allowing unlocking of the folded back doors does not result from action of the jacks 4 for controlling the doors. It takes place automatically under the action of the springs 50 as soon as the difference in pressure acting on the doors 5, 6 drops below the chosen threshold, determined by said springs 50.

The doors are therefore kept in their advanced (safety) position by the elastic bracing system 11-14, 35. They can be deployed only when the jacks receive the order to push, and said jacks are dimensioned to be able to overcome this bracing with a reasonable margin (the aerodynamic forces acting on the doors would be sufficient to lead to full deployment as soon as the bracing effect has been broken).

Figure 13:
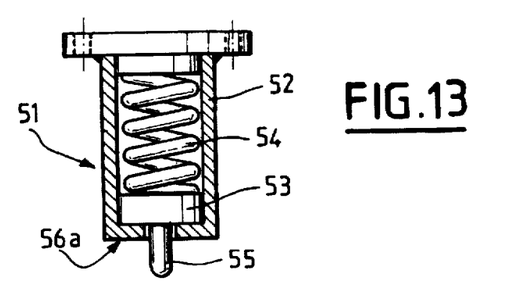
FIG. 13 shows, in axial section, one embodiment of the elastic overretraction means in the form of a spring-loaded piston.
Figure 14A:
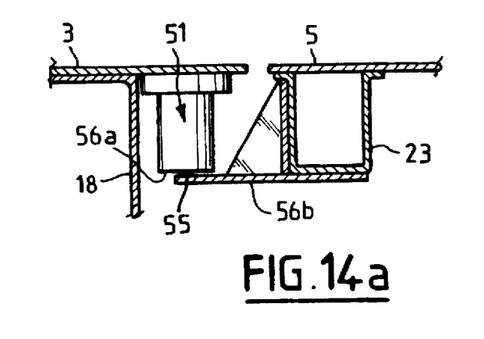
FIGS. 14a and 14b illustrate respectively in the retracted position and in the overretracted position of a reverser door, the operation of a spring-loaded piston of FIG. 13.
Figure 14B:
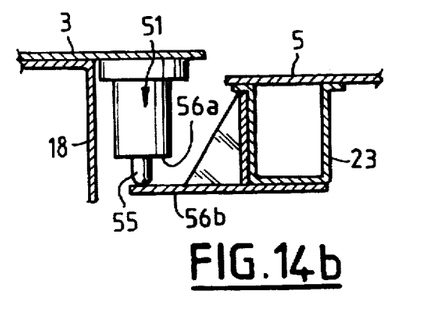

In FIG. 12b it has been assumed that the elastic means 50 were coil springs, respectively integrated in a stop element 16. In the alternative embodiment illustrated by FIGS. 13, 14a and 14b, elastic means 50 are produced in the form of spring-loaded pistons 51, independent of the stops 15, 16. Each spring-loaded piston 51 includes a cylinder 52 capable of being fixed to the engine and containing a piston 53 pushed by a spring 54 and provided with a finger 55 projecting out of the cylinder 52 with respect to an end face 56a thereof. Moreover, provided at the front part of the doors 5, 6 are supports 56b (borne for example by the frame 23) capable of interacting with the spring-loaded pistons 51. These supports 56b are either in contact with the end face 56a (retracted position of FIG. 14a) or pushed by the fingers 55 (overretracted position of FIG. 14b).

Figure 15A:
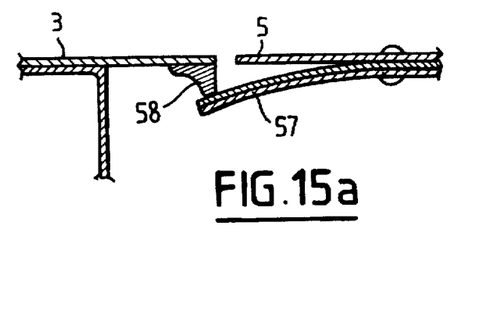
FIGS. 15a and 15b illustrate, respectively in the retracted position and in the overretracted position of a reverser door, elastic overretraction means produced in the form of a leaf spring.
Figure 15B:
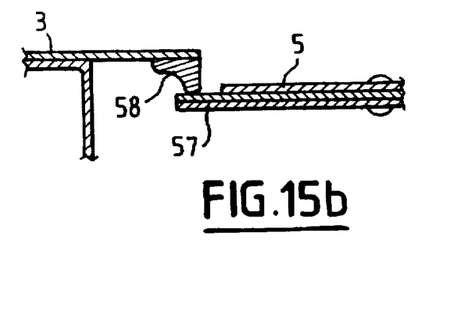

FIGS. 15a and 15b show respectively in the retracted position and in the overretracted position, an alternative to the elastic means 50 in which these are produced in the form of leaf springs 57 fixed to the front part of the doors 5, 6 and interacting with supports 58 borne by the engine.

Moreover, the two stable positions, the advanced position 7A, and retreated position 7R, of the pivots 7 may demand different stabilizing forces.

For example, for an engine having a ground thrust of the order of 2500 daN provided with a jet pipe whose outlet diameter is equal to approximately 0.6 m, the force exerted on each of the two pivots 7 of a door 5, 6 in the overretracted position (pivots 7 in the advanced position 7A) is of the order of 50 daN, when the jet pipe pressure is at the critical threshold (P approximately equal to 0.05 hbar).

In contrast, for the same engine, when a door 5, 6 is in the deployed position (pivots 7 in the retreated position), the reaction on each pivot 7 may reach a much higher value, of the order of 250 daN, at the moment of retraction under the action of the main jack or jacks pulling on the connecting rods 9.

A reaction as great as this runs the risk, for example in the embodiment of FIGS. 5 and 6, of causing the pivot holder 10 to rotate, thereby excessively compressing the spring-loaded stop 14, even though the angle of the link rods 12, 13 is very wide (see FIG. 6), and this would harden said stop.

For this reason, according to an important specific feature of the present invention, means are provided for hardening said spring-loaded stop 14 still further during retraction of the doors 5, 6.

Figure 16:
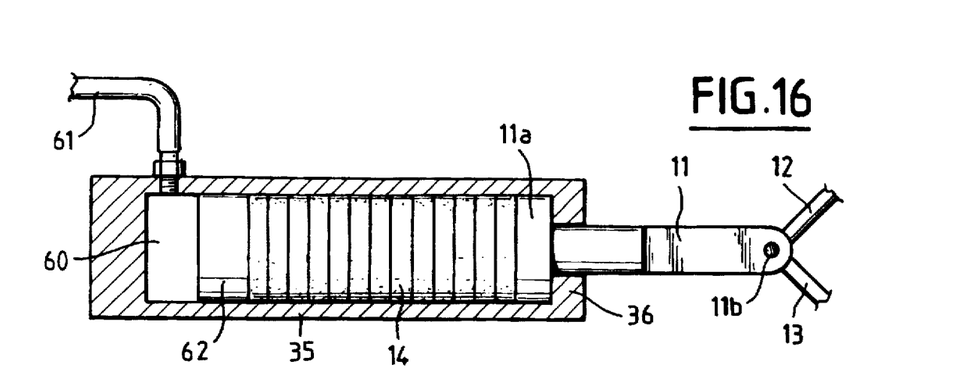
FIG. 16 illustrates, in diagrammatic longitudinal section, one embodiment of an elastic stop which has been hardened during retraction of the deployed doors of the thrust reverser in accordance with the present invention.

To this end, as FIG. 16 shows, the cylindrical body 35 of the bracing system 11-14, 35 includes, on the side opposite the rod 11, a jack chamber 60 into which there emerges a hydraulic line 61 fed with hydraulic fluid by a tapping of the hydraulic retraction line 4b of the jacks 4 actuating the connecting rods 9. Mounted in the jack chamber 60, between the hydraulic line 61 and the elastic stop 14 is a hydraulic piston 62 subjected to the pressure of the hydraulic fluid present in the jack chamber 60.

It will be readily understood that when the jacks 4 are commanded in a manner to retract the doors 5 and 6, the pressure of the hydraulic fluid of the jack chamber 60 is high (it corresponds to the pressure required for retraction), so that the piston 62 is pressed hard against the elastic stop 14 which, for its part, presses hard against the head of the piston 11a of the rod 11. Hardening of the elastic stop 14 is thus obtained.

From the foregoing description it is clear that the operation of the thrust reverser in accordance with the present invention puts to good use the thrust exerted by the engine on the internal face of the doors, in the folded back position. Now, it may be the case that for some engines or some thrust reverser structures (for example those in which the reversal doors are arranged around and behind the jet pipe), said doors are subjected, on the part of the engine, to a pressure which differs only slightly from the ambient pressure. For this reason, according to another important characteristic of the present invention, in order to be able to implement the latter even in the case in which the reversal doors are not naturally subjected to sufficient pressure forces, zones pressurized by the partially expanded exhaust gases from said engine are created artificially on the internal face of said doors.

Figure 17:
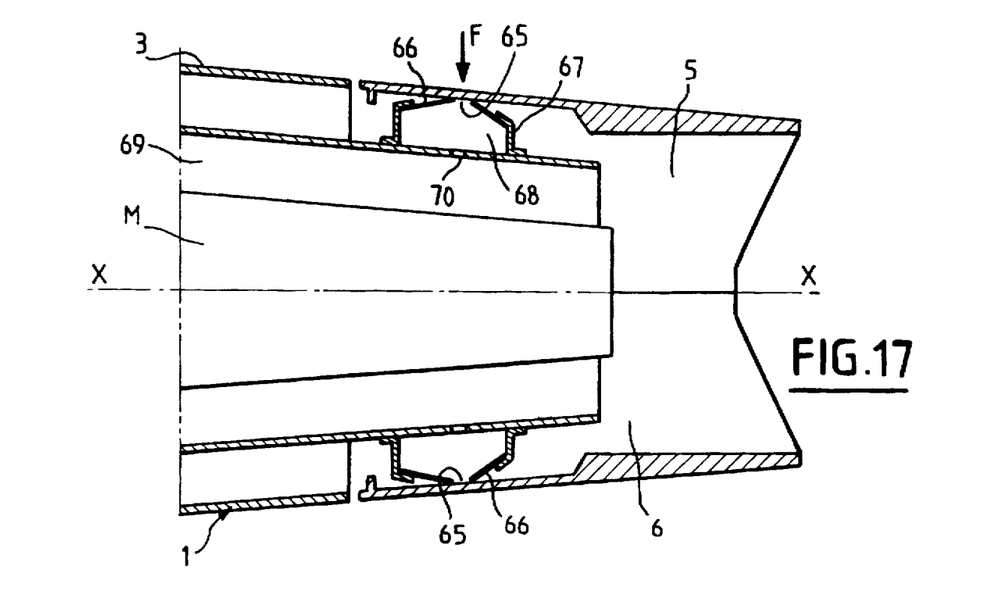
FIGS. 17 and 18 illustrate the creation of pressurized zones under the reverser doors, in engines in which the internal face of said doors in subjected to a pressure which differs little from the ambient pressure.
Figure 18:
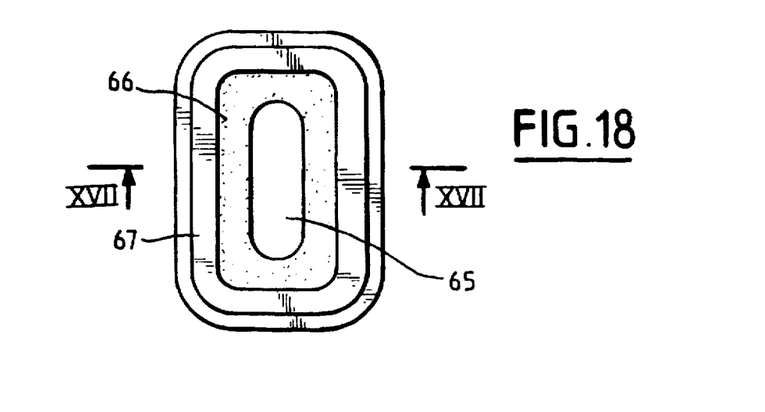

For example, in FIG. 17, there is represented a bypass engine, on the jet pipe 1 of which the reversal doors 5 and 6 are arranged around and behind said jet pipe 1. As a result of this, the pressure between said doors 5 and 6 is close to ambient pressure. For this reason (see also FIG. 18 which is a view in the direction of the arrow F in FIG. 17, it being assumed that the door 5 has been removed), pressurized zones 65 delimited by closed seals 66 pressing elastically by their internal periphery on the internal face of the doors 5 and 6 have been formed on said internal faces.

The external peripheries of the seals 66 are integral with fixtures 67 delimiting chambers 68 under said seals 66. In FIG. 17, the chambers 68 correspond to sections on XVII—XVII of FIG. 18.

In the embodiment represented in FIG. 17, the chambers 68, fixed to the jet pipe 1, are set to the pressure of the cold stream duct 69 by calibrated nozzles 70. Thus, the zones 65 are brought to the pressure of the cold, partially expanded, gases of the upstream part of the jet pipe.

A slightly higher upstream pressure may possibly be brought into the chambers 68 by a tube fixed along the cold stream duct 69, instead of being introduced into said chambers by the calibrated nozzles 70.

I claim:

1. A thrust reverser for an aircraft jet engine including:
   at least one door, the rear end of which is mounted so that said door can pivot with respect to said engine, about an axis of pivoting (P—P) arranged at the rear end of said engine and arranged transverse to the longitudinal axis (X—X) of said engine;
   means for making each door pivot about said axis of pivoting (P—P), between:
      an extreme retracted position, in which said door is subjected by said engine to pressure forces acting in the direction of deployment; and
      an extreme deployed position, in which said door is arranged at least substantially transversely to said longitudinal axis (X—X) of the engine; and
   means for displacing said axis of pivoting (P—P) along said longitudinal axis (X—X) of the engine, a distance between an advanced position and a retreated position and vice versa, the distance separating said advanced and retreated positions along the longitudinal axis of the engine being of the order of 1% to 2% of the diameter of the outer orifice of the engine, and
   radial stop means having no control means and including elements integral with the front end of each door and capable of interacting with mating elements integral with said engine; said radial stop means being designed to prevent the deployment of said door in the advanced position of said axis of pivoting (P—P) and to allow this deployment in the retreated position of said axis of pivoting, and wherein said at least one door is deployed only when said means for displacing the axis of pivoting receives a control order.

2. The thrust reverser as claimed in claim 1, wherein said means for displacing said axis of pivoting (P—P) are formed by the means for pivoting said each door.

3. The thrust reverser as claimed in claim 1, wherein said means (4, 9) for displacing said axis of pivoting (P—P) along said longitudinal axis (X—X) of the engine include guide means having slideways (7F) and sliders (7).

4. The thrust reverser as claimed in claim 3, in which said door (5, 6) is subjected, on the part of said engine (M), to pressure forces acting in the direction of deployment, wherein said slideways (7F) have a shape such that in the extreme retracted position of said door and in the advanced position of said axis of pivoting (P—P), the interaction of said sliders (7) with said slideways (7F), combined with the action of said pressure forces on said door, locks said axis of pivoting (P—P) in its advanced position.

5. The thrust reverser as claimed in claim 4, wherein said slideways (7F) exhibit the shape of an arc, the front portion of which is further from said longitudinal axis (X—X) of the engine than the central portion of said arc.

6. The thrust reverser as claimed in claim 1, wherein associated with each door (5, 6) are two sliders (7) and two slideways (7F), said sliders defining said axis of pivoting (P—P) and the position of said axis of pivoting along said longitudinal axis (X—X) of the engine being defined by the relative position of each slider in each slideway.

7. The thrust reverser as claimed in claim 6, wherein said sliders (7) are integral with said door (5, 6), while said slideways (7F) are provided on said engine.

8. The thrust reverser as claimed in claim 1, wherein in the retreated position, said axis of pivoting (P—P) is further from said longitudinal axis (X—X) of the engine than in the advanced position and wherein said means (4, 9, 7, 7F, 10) for displacing said axis of pivoting (P—P) along said longitudinal axis (X—X) of the engine are designed to separate said axis of pivoting (P—P) from said longitudinal axis (X—X) of the engine when said axis of pivoting (P—P) passes from its advanced position to its retreated position and, conversely, to bring said axis of pivoting (P—P) closer to said longitudinal axis (X—X) of the engine when said axis of pivoting (P—P) passes from its retreated position to its advanced position.

9. The thrust reverser as claimed in claim 8, in which said means (4, 9) for displacing said axis of pivoting (P13 P) along said longitudinal axis (X—X) of the engine include guide means having slideways (7F) and sliders (7), wherein said slideways (7F) exhibit an elbowed or arched shape, the front portion of said slideways being the portion closest to said horizontal axis (X—X).

10. The thrust reverser as claimed in claim 1, wherein said means (4, 9) for displacing said axis of pivoting (P—P) along said longitudinal axis (X—X) of the engine (M) include, for each door, two rotary pivot holders (10) each one borne by a spindle for rotation (10a) integral with the engine and each bearing an eccentric pivot (7), the two eccentric pivots being aligned in order to define said axis of pivoting (P—P).

11. The thrust reverser as claimed in claim 1, which includes a bracing system (11, 12, 13) urged by elastic stop means designed, on the one hand, to confer upon said axis of pivoting (P—P) two stable positions corresponding respectively to said advanced and said retreated positions and, on the other hand, to allow said axis of pivoting (P—P) to change position under the effect of a force greater than a threshold determined by said elastic stop means.

12. The thrust reverser as claimed in claim 11, in which said axis of pivoting (P—P) is defined by two aligned pivots (7) respectively arranged on either side of said door, wherein said bracing system includes, for each pivot (7), a link rod connected to said pivot at one of its ends and articulated at its other end to a rod (11) capable of being displaced axially along an axis parallel to the longitudinal axis (X—X) of the engine, said rod being urged by a spring-loaded stop capable of opposing its axial displacement.

13. The thrust reverser as claimed in claim 12, including two doors (5, 6) which are opposed and symmetric with respect to said longitudinal axis (X—X) of the engine, wherein for each pair of pivots (7) arranged one facing the other and associated respectively-with each of the two opposed doors (5, 6), said bracing system comprises a rod (11) extending substantially in the plane of symmetry of the engine, and two symmetric link rods each articulated to said rod (11) and connected respectively to one of said pivots (7).

14. The thrust reverser as claimed in claim 11, which includes means (60-62) for hardening said elastic stop means (14) when said door (5, 6) is retracted from its deployed position to its retracted position, said axis of pivoting (P—P) then being in the retreated position.

15. The thrust reverser as claimed in claim 14, wherein said hardening means (60-62) are hydraulic.

16. The thrust reverser as claimed in claim 1, wherein said radial stop means are formed on the one hand by the front edge (28) of said door (5, 6) and, on the other hand, by the rear edge of the upstream part (3) of said engine (M), said front edge of the door being designed to engage at least locally under said rear edge of said upstream part of the engine.

17. The thrust reverser as claimed in claim 1, wherein said radial stop means are formed on the one hand by pegs (27) projecting longitudinally with respect to the front edge of said door (5, 6) and, on the other hand, by housings (26) formed axially relative to the rear edge of the upstream part of said engine and each capable of housing a peg (27).

18. The thrust reverser as claimed in claim 1, wherein said mating elements integral with said engine have a cam profile designed to generate a reaction including a longitudinal component capable of opposing the retreat of the door.

19. The thrust reverser as claimed in claim 18, wherein each receptacle (19, 20) includes, at the front of the cam profile, a front portion (34) for guiding the corresponding stop element (25) during displacements of the axis of pivoting (P—P) between its advanced position and retreated position, said guide portion being designed to lead to a displacement of the stop element (25) in a path substantially inclined with respect to the longitudinal axis (X—X) so as to give rise to overretraction of the door (5, 6) during a displacement toward the rear of said stop element.

20. The thrust reverser as claimed in claim 18, wherein each receptacle (19, 20) is extended toward the rear by a radial stop face (21) parallel to the longitudinal axis X—X able to serve as a stop to the corresponding stop element (25) when the door (5, 6) is brought into its folded back position, so as to cause at least one bracing system (10-14) to tilt.

21. The thrust reverser as claimed in claim 1, in which said door (5, 6) is subjected, on the part of the engine (M) to pressure forces in the direction of deployment, wherein:

in the retracted position, each door (5, 6) is subjected to the action of elastic means (50) in the direction of overretracting said door; and said thrust reverser also includes anti-retreat means (19, 20, 25) which prevent the passage of said axis of pivoting (P—P) from its advanced position to its retreated position as long as the pressure forces exerted by said engine (M) on said door in the direction of deployment are above the opposing force exerted on said door by said elastic means (50).

22. The thrust reverser as claimed in claim 21, wherein said anti-retreat means (19, 20, 25) are integrated into said radial stop means.

23. The thrust reverser as claimed in claim 22, wherein said mating element integral with said engine are open facing the axis (X—X) of said engine.

24. The thrust reverser as claimed in claim 21, wherein said elastic means (50) are integrated into said radial stop means (15, 16).

25. The thrust reverser as claimed in claim 21, wherein said elastic means (50) are independent of said radial stop means (15, 16) and are borne by the front end of each door (5, 6) or by the engine (1), said elastic means (50) interacting with supports (56, 58) borne by the engine or by the front end of said door (5, 6), respectively.

26. The thrust reverser as claimed in claim 21, wherein said elastic means (50) are formed by spring-loaded pistons (51).

27. The thrust reverser as claimed in claim 21, wherein said elastic means (50) are formed by leaf springs (57).

28. The thrust reverser as claimed in claim 1, in which said door (5, 6) is not spontaneously subjected to significant pressure forces by said engine (M), which reverser includes at least one pressurized chamber (68) receiving low-pressure exhaust gases from said engine (M) and provided with a flexible seal (66) which, when said door (5, 6) is retracted, presses in a sealed manner against the internal face of said door, therein delimiting a pressurized zone (65) of precise surface area.

29. The thrust reverser as claimed in claim 1 wherein said mating elements integral with said engine are non-moving.

* * * * *